No. 771,635. PATENTED OCT. 4, 1904.
C. A. HIRTH.
MACHINE FOR ATTACHING SAFETY LABELS TO BOTTLES WITH LEVER CLOSING DEVICES.
APPLICATION FILED JAN. 14, 1903.
NO MODEL. 8 SHEETS—SHEET 1.

WITNESSES:
C. P. Goepel.
Henry J. Suhrbier

INVENTOR
Carl Albert Hirth
BY Gomez Viles
ATTORNEYS.

No. 771,635. PATENTED OCT. 4, 1904.
C. A. HIRTH.
MACHINE FOR ATTACHING SAFETY LABELS TO BOTTLES WITH LEVER
CLOSING DEVICES.
APPLICATION FILED JAN. 14, 1903.
NO MODEL. 8 SHEETS—SHEET 4.

WITNESSES:
C. P. Goepel
Henry J. Suhrbier

INVENTOR
Carl Albert Hirth
BY Gower Niles
ATTORNEYS.

No. 771,635. PATENTED OCT. 4, 1904.
C. A. HIRTH.
MACHINE FOR ATTACHING SAFETY LABELS TO BOTTLES WITH LEVER CLOSING DEVICES.
APPLICATION FILED JAN. 14, 1903.
NO MODEL. 8 SHEETS—SHEET 6.

WITNESSES:
C. P. Goepel
Henry J. Suhrbier

INVENTOR
Carl Albert Hirth
BY Gorner Niles
ATTORNEYS.

No. 771,635. PATENTED OCT. 4, 1904.
C. A. HIRTH.
MACHINE FOR ATTACHING SAFETY LABELS TO BOTTLES WITH LEVER CLOSING DEVICES.
APPLICATION FILED JAN. 14, 1903.

NO MODEL. 8 SHEETS—SHEET 8.

No. 771,635. Patented October 4, 1904.

UNITED STATES PATENT OFFICE.

CARL ALBERT HIRTH, OF STUTTGART, GERMANY.

MACHINE FOR ATTACHING SAFETY-LABELS TO BOTTLES WITH LEVER CLOSING DEVICES.

SPECIFICATION forming part of Letters Patent No. 771,635, dated October 4, 1904.

Application filed January 14, 1903. Serial No. 139,036. (No model.)

*To all whom it may concern:*

Be it known that I, CARL ALBERT HIRTH, a citizen of the Empire of Germany, residing in Stuttgart, in the Kingdom of Würtemberg, Empire of Germany, have invented certain new and useful Improvements in Machines for Attaching Safety-Labels to Bottles with Lever Closing Devices, of which the following is a specification.

Bottles provided with the well-known "lightning" or other lever closing-stoppers are usually protected against unauthorized opening by pasting a paper strip over the locking-lever when the bottle is closed. By using this safety device it is necessary to paste a second special label on the bottle in order to denote the contents of it. The use of such a safety-strip and label is open to certain objections, as the paste easily dissolves under the influence of moisture, so that the labels are liable to drop off. Furthermore, the safety-strip can be removed and pasted on again, so that the object of the safety-strip would be rendered nugatory. Another important disadvantage was found in washing the empty bottles, in which case the removal of the labels is connected with some difficulty when good paste is used and sometimes almost impossible without the aid of a scraper. The water in which the bottles are washed is quickly smudged by the dissolved paste and pieces of paper, so that a frequent changing of the water is required. Besides that, it is difficult to remove the paste still adhering to the bottles. The entrance of wash-water to the interior of the bottles, which is unavoidable, is furthermore highly objectionable and contrary to hygienic principles.

For the purpose of overcoming the objections just described the object of this invention is to furnish an improved machine by which the pasting of labels on the bottles may by dispensed with and by which the closing-levers of the stoppers are secured by a safety device consisting of a ticket or label which is applied to the stopper-bail by a neck-wire or string and staple in a quick and effective manner and at considerable less expense than the safety device and labels heretofore used for this purpose; and for this purpose the invention consists of a machine for attaching safety-labels to bottles with lever closing devices, which comprises means for passing a string or wire between the bottle-neck and the bail of the bottle-stopper, looping it around the locking-lever and bail, and attaching the ends of the string or wire to a label or ticket by a metallic staple clenched thereto.

The invention consists, further, of suitable means for feeding a strip of paper printed with the text of the label, cutting the label from the same, and feeding it to the mechanisms for attaching the ends of the string or wire and staple.

The invention consists, lastly, of the constructive details of the string or wire holding, feeding, and looping devices, which will be fully described hereinafter and finally pointed out in the claims.

In the accompanying drawings, Fig. 2 is a perspective view of a bottle, showing my improved safety-label as applied to the locking device of the same.

Similar characters of reference indicate corresponding parts.

My improved machine for attaching safety-labels to bottles with lever closing devices consists of the following principal mechanisms: first, a string or wire feeding and cutting-off device; second, a gripper device for taking hold of the cut-off string or wire; third, a device for looping the string or wire around the bail and locking-lever of the stopper; fourth, a feeding device and mechanism for cutting the labels or tickets from the supply-strip; fifth, a die for feeding and clenching a sheet-metal clasp to the ends of the string or wire and the label or ticket.

Any suitable motion-transmitting means which are actuated by cams on the driving cam-shaft may be employed for actuating the operating devices described, said transmitting mechanism forming no part of the invention, and therefore not being described.

Figure 3:
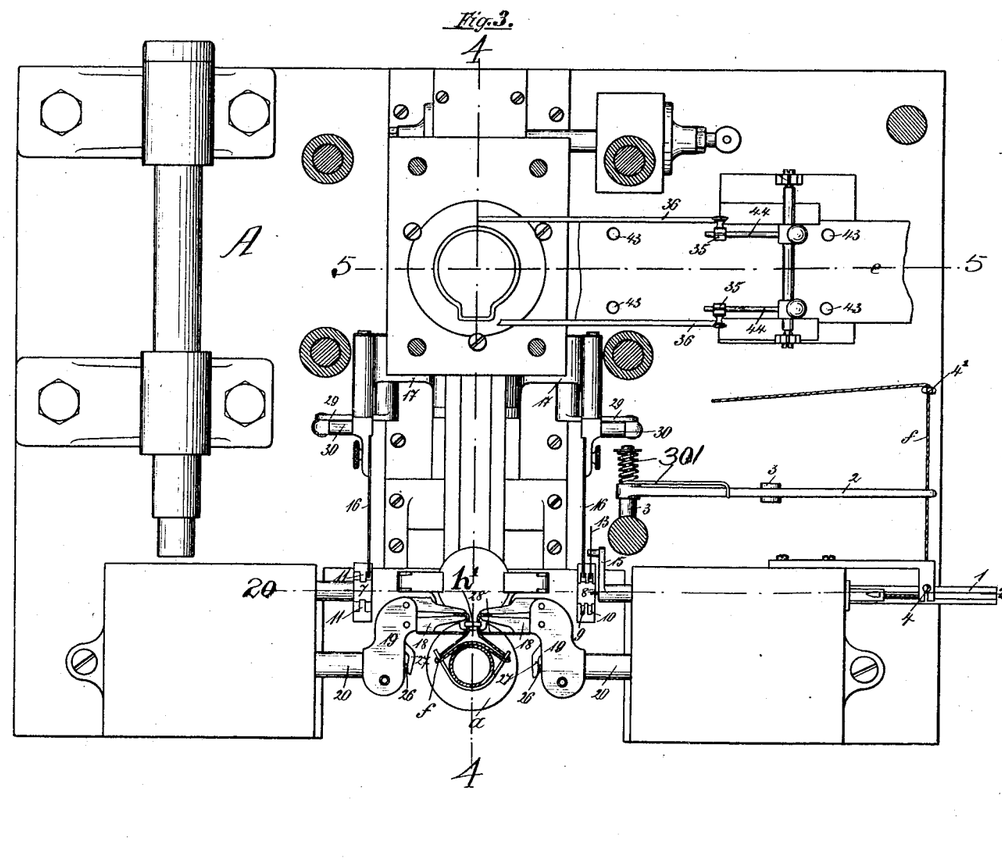
Fig. 3 is a plan view, partly in horizontal section.
Figure 6:
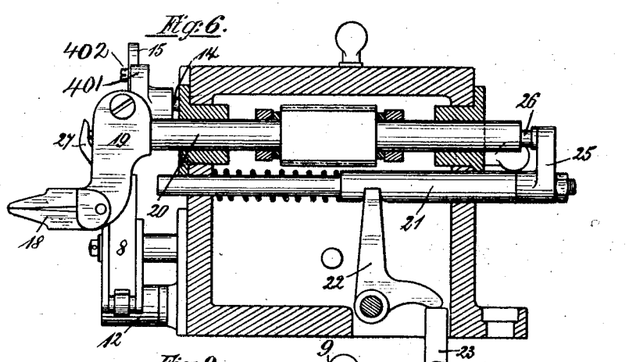
Fig. 6 is a detail vertical section on line 6 6, Fig. 7, showing the looping-grippers and their actuating mechanism.
Figure 7:
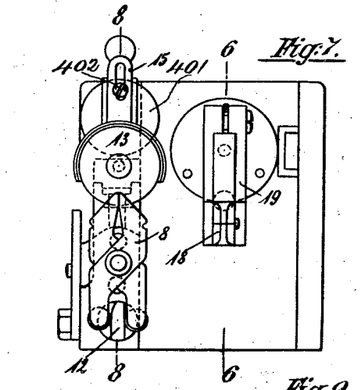
Fig. 7 is an end elevation of Fig. 6.
Figure 8:
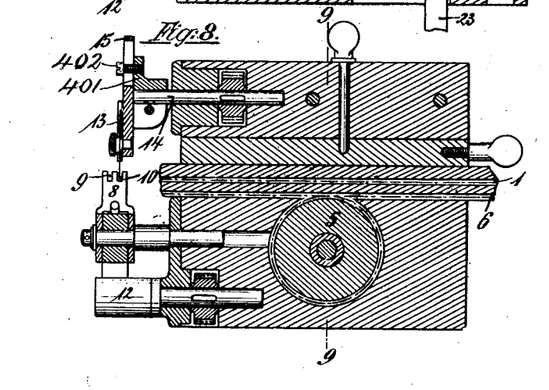
Fig. 8 is a vertical longitudinal section on line 8 8, Fig. 7.
Figure 9:
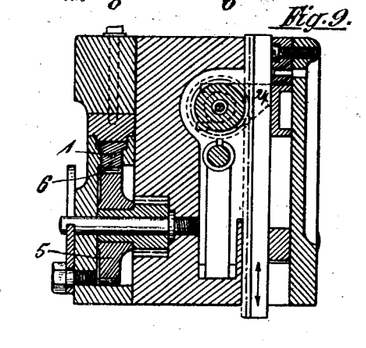
Fig. 9 is a vertical transverse section on line 9 9, Fig. 8.
Figure 10:
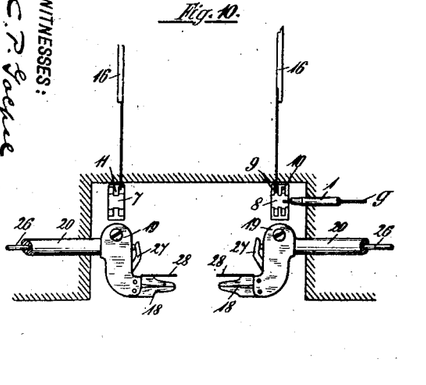
Figs. 10 to 15 are detail plan views of the string or wire feeding and looping devices, showing the successive positions of the same while the string or wire is looped around the closing-lever and bail of the bottle-stopper.
Figure 11:
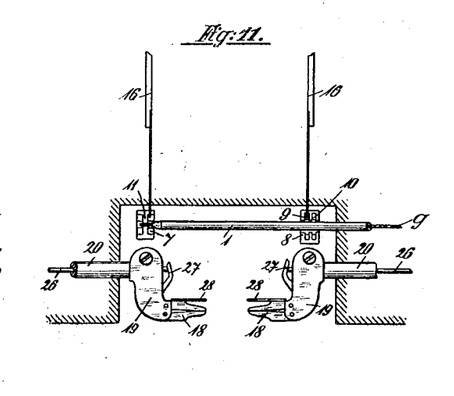
Figure 12:
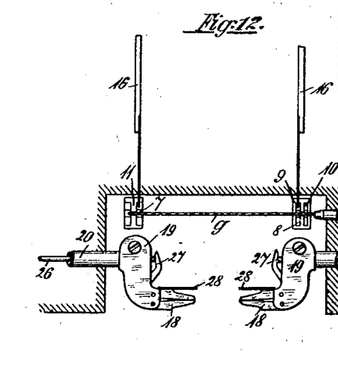
Figure 20:
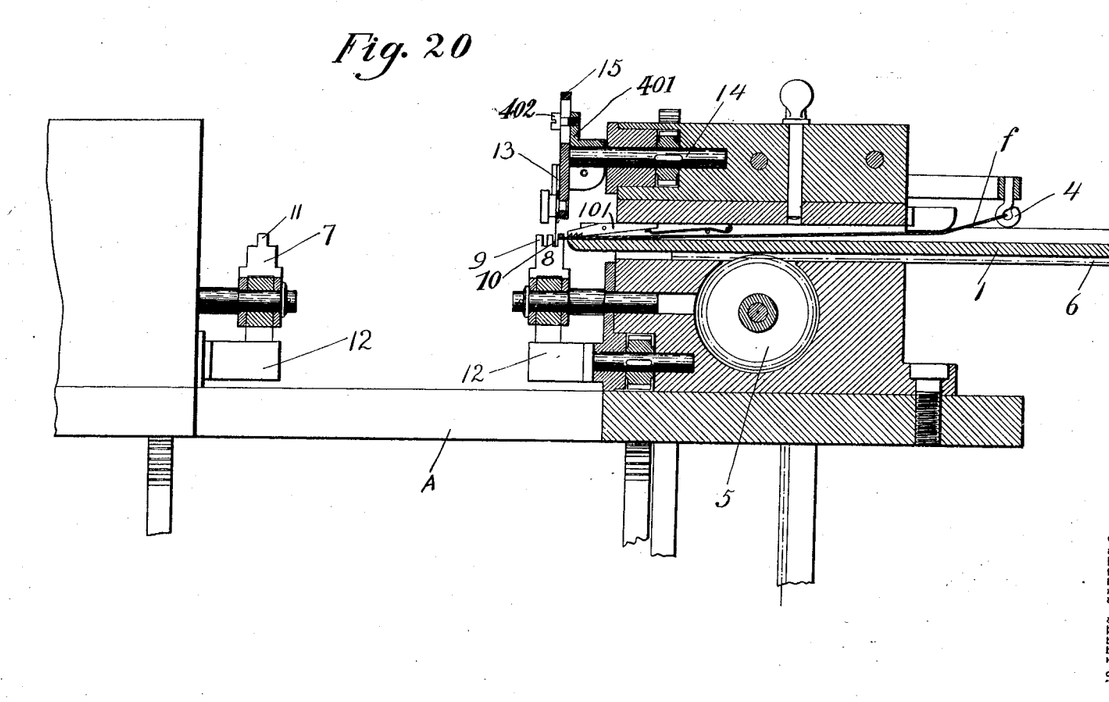
Fig. 20 is a vertical longitudinal section of Fig. 3, taken on line 20 20.

The machine consists of a bed-plate A, at the front part of which are arranged symmetrical to the vertical center plane of the machine the string or wire feeding devices and the looping-grippers, while the label-feeding device and mechanism are at the right-hand part of the machine. The cutting-die is arranged at the rear part of the machine and in line with the vertical center plane of the machine. The devices for feeding the label forward to the bottle and the clasp-clenching devices are arranged in the center plane of the machine. The string or wire $f$, employed for holding the ticket or label, is fed from a suitable reel and conducted first through an eye or upright fork $4^1$, then through a hole in the end of a lever 2, which turns on a fulcrum 3, said lever being acted upon by a spring 301, so as to produce the unwinding of the string or wire from the reel. The string or wire passes then over a second guide-eye 4 into the quill, which is located at right angles to the center plane of the machine, as shown in Fig. 3, the quill 1 being slotted at the rear end and provided at its opposite end with a spring-actuated clutch device 101, which prevents the backward sliding of the string or wire without interfering with the forward or outward motion of the same. The quill 1 is capable of longitudinal motion by a rack 6 at its lower end and a gear-wheel 5, meshing therewith, as shown in Figs. 8 and 20. Below the quill 1 are arranged at both sides of and symmetrical with the center plane of the machine grippers 7 and 8 in such a manner that the quill can pass through the open jaws of the same, as shown in Figs. 3 and 10 to 15. The gripper 8 is provided with two recesses 9 and 10, while the gripper 7 is only provided with a center clamping-rib 11. The opening of the grippers 7 and 8 is accomplished by an axially-movable cam 12, while the closing of the same is produced by a spring, both being shown in Figs. 6 and 7. Above the gripper 8 is arranged a circular knife for cutting off the string or wire. This circular knife consists of a disk 13, which is located eccentrically to its shaft 14 on an arm 15, which is capable of adjustment on the hub 401 of the disk by means of a set-screw 402, as shown in Fig. 7. The circular knife can thereby be used along its entire circumference, with exception of a small portion which is not provided with a cutting edge. During the cutting action the knife turns on its shaft 14 in the recess 10 of the gripper 8, as shown in Figs. 3, 8, and 20. When the string or wire $f$ has been fed forward by the quill 1 until the end of the wire $f$ arrives at gripper 7, the same closes and clamps the end securely. The quill then returns, the clutch 101 of the same permitting it do so until the end of its stroke, when the gripper 8 closes and also holds the wire securely, as well as in taut position, in place.

Figures 16, 17, 18, 19:
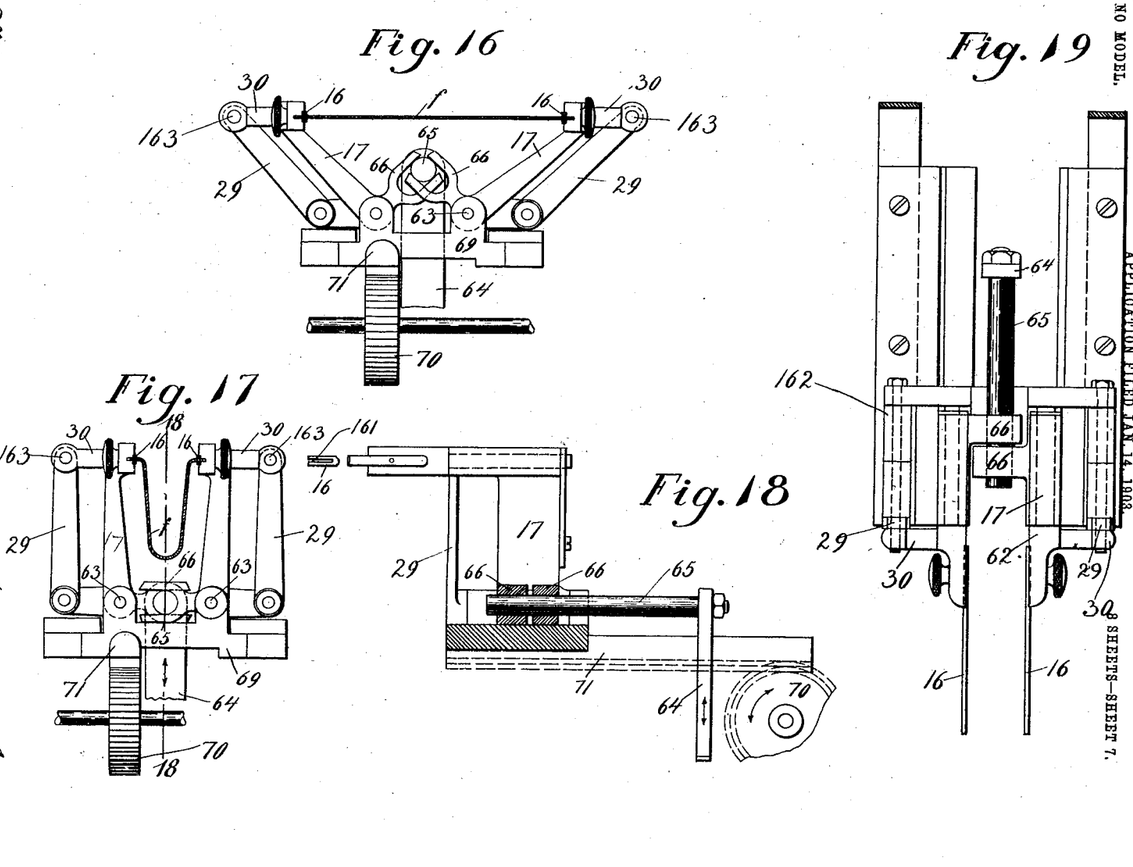
Figs. 16 and 17 are front views of the feeding devices and actuating means therefor, showing the same in different positions.
Fig. 18 is a vertical longitudinal section of Fig. 17, taken on line 18 18.
Fig. 19 is a top view of Fig. 17.

The second gripper device consists of two parallel arms 16, which are provided with forked and feathering ends 161, that are preferably bent outwardly at their ends for the more reliable engagement of the string or wire. The arms 16 are adjustably attached to crank-arms 17 in such a manner that they are turned by the rotation of the cranks parallel to the axis of rotation of the same, as shown clearly in Figs. 16, 17, and 18. The arms 16 are swiveled in the crank 17 and are connected with the governing-rods 29 by arms 30, the arms 30 and the governing-rods 29 being pivotally connected by a pin 163, so that the gripper-arms 16 do not change their position during the rotation of the cranks, but remain always parallel with each other, so that the gripping ends of the arms 16 are always located in vertical position and prevent thereby the turning out of the string or wire around the arms 16. When a string or wire $f$ is fed through the quill 1 to the gripper 8 over to gripper 7, the same is held in stretched position, and the gripping devices on the arms 16 can then engage the same by their feathering and clamping ends, the left-hand gripper alongside of the gripper 7 at the right-hand side of its rib 11, while the right-hand gripper takes hold of the string or wire in the slot 9 of the gripper 8. When both grippers 16 have just engaged the string or wire, the circular cutting-knife is actuated, so as to cut off the string or wire $f$, as shown in Fig. 13.

Figure 13:
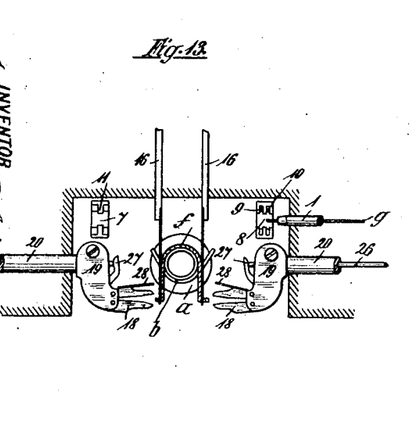

A third pair of looping-grippers 18 is located at both sides of the center plane of the machine adjacent to the grippers at the ends of the arms 16 when the latter are in their forward position, as shown in Fig. 13, said third pair of looping-grippers being supported on the ends of cranks 19, which are mounted on shafts 20. The jaws of the looping-grippers 18 protrude toward each other and are fulcrumed to the cranks 19. A rotary motion through an angle of one hundred and eighty degrees is imparted to the shafts 20 by means of a fork or clutch 24, that can be shifted in the direction of the axis of the shaft 20, so that in addition to the axially-rotating motion a shifting motion is imparted, so as to produce the closing or opening of the looping-grippers, as shown in Figs. 6, 9, 10, and 13. This opening or closing of the looping-grippers is accomplished by a spring-actuated rod 21, which is actuated by an elbow-lever 22 and lifter-rod 23. This motion is transmitted by the arm 25 to a longitudinal rod 26, which is loosely located in a longitudinal center bore of the shaft 20, which rod acts on a lever 27 on the oscillating jaw of the looping-grippers, as shown clearly in Fig. 6.

Figure 14:
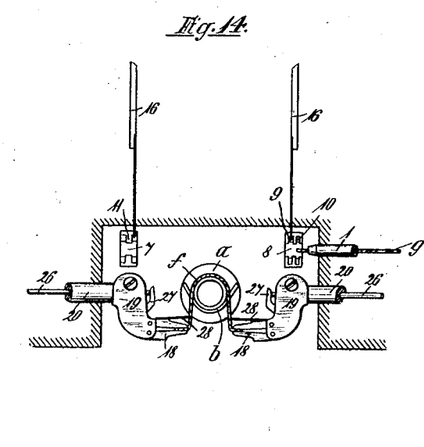
Figure 15:
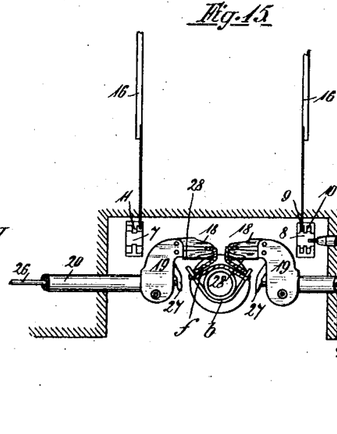

The grippers 161 on the arms 16 turn with their crank-arms 17 toward each other, which is accomplished by means of a rod or small shaft 65 on an actuating-rod 64, engaging the forked ends 66 of the crank-arms 17 as soon as the grippers have released the string or wire, by which movement the string or wire is permitted to hang down in a loop, the ends of which are fed by the forward motion of the feed-grippers 18 through the space between the bottle-neck and the bail $b$ of the stopper around one-half the bottle-neck, as shown in Fig. 13. The forward motion of the feed-grippers 16 is obtained by means of a rack 71 at the bottom of the support 69, on which the feed-grippers are pivoted, meshing with a gear-wheel 70, in turn actuated by any suitable means. The looping-grippers 18 are opened, inasmuch as the lifting-rods 23 act on the elbow-levers 22, so that the ends of the string or wire which protrude from the feed-grippers 16 between the jaws of the looping-grippers 18 are engaged thereby, as shown in Figs. 13 and 14. The feeding-grippers 16 are then returned immediately into their initial position. The looping-grippers 18 are then moved around the bail $b$ of the stopper around an angle of one hundred and eighty degrees, as described, the ends of the string or wire being simultaneously looped around the shank of the locking-lever and bail-wire and moved so as to approach each other, while at the same time guides 28, which project from one of the jaws of the looping-grippers 18, serve to hold the ends of the string or wire parallel, as shown in Fig. 15.

While the string or wire is looped around the ends of the bail and shank of the locking-lever of the bottle-stopper, the label or ticket which is attached to the string or wire is simultaneously cut out from a suitable strip of paper or tin that is fed to the cutting-dies and then fed toward the ends of the string or wire held parallel, as described, so as to produce the attaching of the same to the label or ticket by means of a metallic clasp $h^2$, which is clenched by suitable mechanism to the label or ticket.

Figure 5:
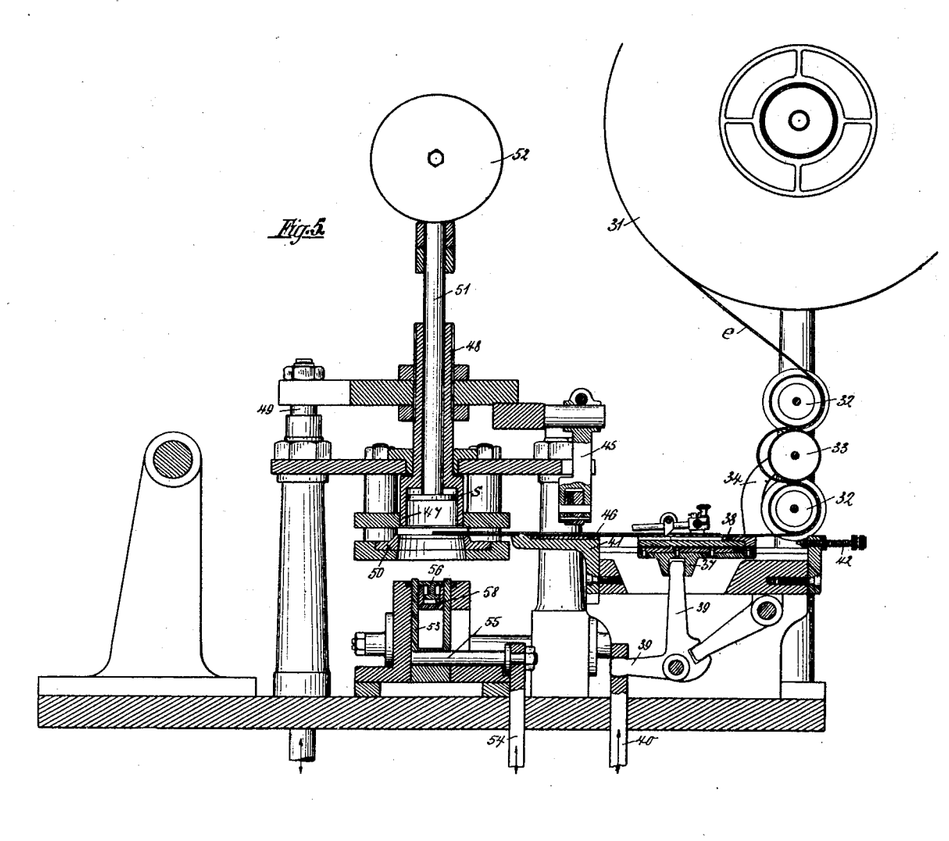
Fig. 5 is a vertical section taken on line 5 5, Fig. 3, and showing the mechanism for feeding the paper strip and cutting the labels or tickets from the same.

The paper-feeding and label-cutting die is constructed as follows: On a strip of paper $e$ of suitable width are printed at a suitable distance from each other the texts of the labels, said strip being wound upon a reel 31 and guided from the reel around the feed-rolls 32 33. The guide-roll 33 is supported in the ends of an oscillating lever 34 and serves for unwinding the strip $e$ from the reel 31 before the feeding device proper engages the paper strip $e$. The strip $e$ is guided adjacent to the guide-roll 32 horizontally in ways 36 and supported on a carrier 37, which is provided with a slide 38, on which the bearings for the shaft of the feed-dog 35 are supported. The carrier 37 moves always through the same distance—that is, has a constant stroke, which is produced by the action of an elbow-lever 39, that receives its motion from a pressure-rod 40, which engages the lower arm of the elbow-lever, as shown in Fig. 5. The slide-plate 38 is carried along by the carrier 37 by friction, its motion being limited by a stationary wall 41 at the left-hand end and by an adjustable stop-screw 42 at the opposite end. In this manner the machine can be used for feeding labels or tickets of different sizes. Along the edges of the strip $e$ are punched holes 43, corresponding to the stroke of the feed-dog 35. The feed-dog is provided with a nose at its lower end, which is beveled at its rear part and applied to an oscillating lever-arm 44, on which the nose can be adjusted so as to permit the easy passing of the feed-dog from the hole 43 of the strip $e$. When the carrier 37 is moved, with the friction-slide 38, from the right toward the left, while the nose of the feed-dog has engaged the opening 43 of the strip $e$, the latter is then moved in forward direction; but when the carrier is moved from the left toward the right the nose of the feed-dog 35 slides from the opening over the strip $e$, which is then held stationary. As soon as the friction-slide 38 abuts against the stop-screw 42 the nose drops into the edge hole 43 of the strip $e$, after which the carrier and strip commence their next forward motion. It is preferable to arrange two feed-dogs, one along each edge of the strip $e$, so as to secure the uniform feeding of the same and prevent any edge binding thereof. The end portion of the strip $e$ passes by the feed-motion of the carrier under a vertically-reciprocating cup-shaped cutting-die 47. In the hollow shank 48 of the same is guided the spindle 51 of a vertically-reciprocating stamp, by which simultaneously with the cutting out of the label or ticket the date of the bottling can be printed on the label or ticket.

Figure 4:
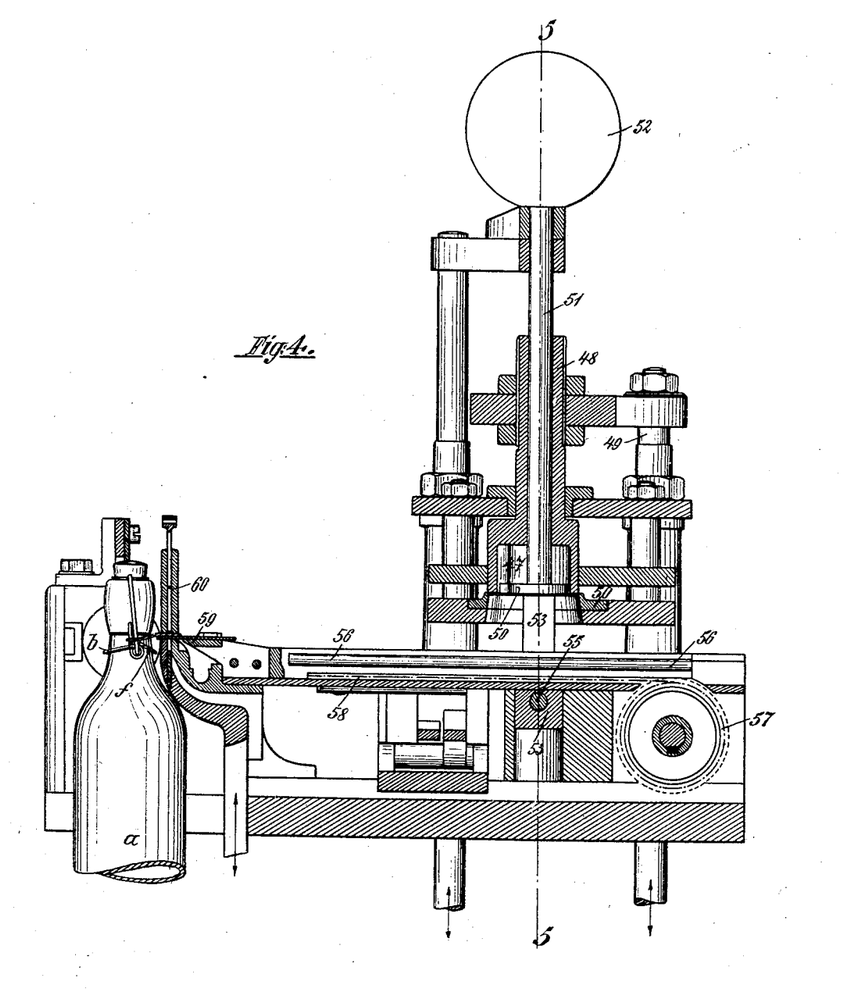
Fig. 4 is a vertical transverse section on line 4 4, Fig. 3.

The label-cutting die is shown in Figs. 4 and 5. It consists of the cup-shaped cutting-die 47, having a tubular shank 48, which die is moved up and down at the proper time, and of a lower cutting-die or matrix 50. The upper end of the spindle 51 of the printing-stamp carries a weight 52. The weighted stamp serves also after the printing of the label or ticket to hold the same after the action of the cutting-dies on a vertically-movable fork-shaped table 53, which is raised or lowered by means of a pusher-rod 54 and lug 55. In the forked table is guided a slide 56, which is operated to and fro by a rack 58 and gear-wheel 57. The slide-piece 56 terminates in a small plate 59, to which the forked table 53 and stamp deliver the label or ticket, after which a forward motion is imparted to the slide 56 in a direction at right angles to that in which the paper strip *e* is conducted to the cutting-dies, so that the label or ticket arrives finally with its end portion projecting over the plate 59 below the parallel ends of the string or wire *f*, the projecting end of the label or ticket being placed simultaneously in a slot of the clasp-clenching device 60, as shown in Fig. 4.

Figure 1:
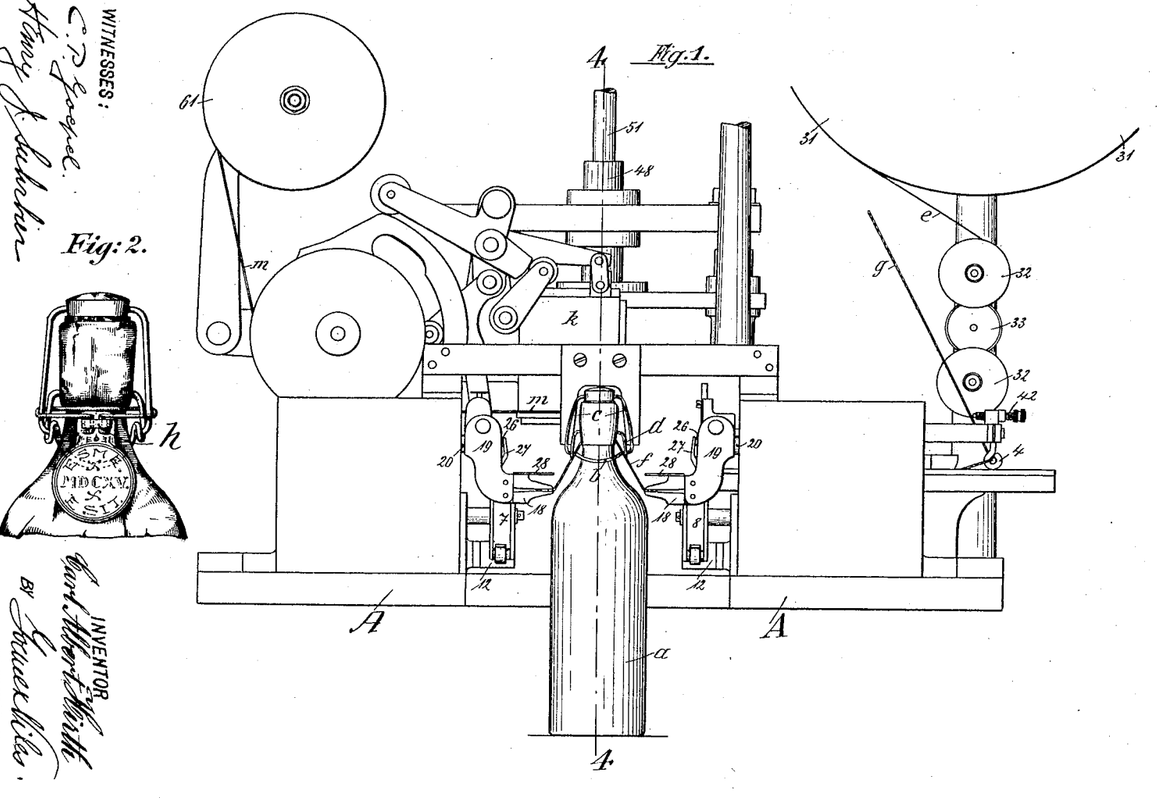
Figure 1 represents a front elevation of my improved machine for attaching safety-labels to bottles with lever closing devices.

The clasp-clenching device consists of a reel 61 for the sheet-metal strip *m* and a bending device, with movable horn, pushing, and bending mechanism. These devices, however, are well known and are indicated only in general outlines in Fig. 1. They may be connected with a supplemental stamping mechanism by which a certain predetermined impression may be imparted to the sheet-metal strip *m* before the cutting off and bending of the clasp. These devices are well known and form no part of this invention.

My improved machine is operated as follows: After the string or wire *f*, the printed paper strip, and the sheet-metal strip for the staples have been placed on their respective reels and in proper position the machine is started, so that the string or wire *f* is conducted through the quill 1 and between the holding-gripper 8 to the holding-gripper 7. This is accomplished by moving the quill 1 over entirely until it is located between the open holding-grippers 7 and 8. By the return motion of the quill 1 the holding-grippers 7 and 8 close on the string or wire and hold the same firmly in taut position, so that the feeding-grippers 16, which are moved in forward direction, can grip the ends of the string or wire *f* between the holding-grippers 7 and 8, while the firmly-clamped end of the string or wire held by the gripper 8 is cut off close to the end of the quill 1 by the rotating cutting-knife 13. The holding-grippers 7 and 8 are then opened and the grippers 16 are moved toward each other, so that the string or wire hangs down in a loop. Simultaneously the feeding-grippers 16 are moved forward and are passed through between the neck of the bottle and the lower ends of the stopper-bail *b* of the bottle, which is held in position at the center front part of the machine. It is obvious that instead of moving the feeding-grippers 16 forward along the bottle-neck the bottle can be placed over the forwardly-moved grippers 16, if desired. When the grippers are in this position, the outwardly-projecting ends of the string or wire *f* are taken up by the looping-grippers 18, which are then turned to an angle of one hundred and eighty degrees into position shown in Figs. 3 and 15, so that the string or wire is passed around the ends of the bail in backward direction, while the loop portion of the string or wire is drawn tightly around the inner half of the bottle-neck. The looping-grippers 18 are then approached toward each other, so that the ends of the string or wire are located parallel and closely to each other by means of the guides on the jaws. While this operation of holding, cutting, feeding, and looping the string or wire is accomplished the printed label-strip is fed forward to the cutting-out dies, cut to the proper shape, and fed forward at right angles to the motion of the paper to a platform near the bottle, in which position the end of the label is located below the ends of the string or wire. In this position of the string or wire and the ends of the label a U-shaped staple is forced through the projecting end of the label over the ends of the string or wire and clenched to the under side of the label, so that the end of the string or wire is firmly clamped to the label, so that the same is suspended on the bottle-neck, as shown in Fig. 2.

The safety string or wire, with the label attached thereto, forms a safety device which prevents the unauthorized opening of the bottle except by tearing off the label and breaking the safety device. The safety-label prevents thereby the unauthorized opening of the bottle and forms a very neat attachment to the same, especially as the date of bottling and other data can be simultaneously stamped on the label.

Having thus described my invention, I claim as new and desire to secure by Letters Patent—

1. A machine for attaching safety-labels to bottles with lever closing devices, which consists of means for feeding a string or wire, means for holding the string or wire, means for cutting off said string or wire, means for passing the cut-off string or wire between the bottle-neck and bail-wire of the stopper, means for looping said wire or string around the stopper-bail and bringing its ends in close proximity with each other, means for feeding a label into position below the ends of the string or wire, and means for clenching a sheet-metal staple over the ends of the string or wire on the label, so as to securely hold the safety-label and wire on the bottle-neck and stopper-bail.

2. A machine for attaching safety-labels to bottles with lever closing devices, which consists of means for feeding a string or wire, grippers for holding the string or wire, an intermittently-rotating knife for cutting off said string or wire, feed-grippers for passing said cut-off string or wire between the bottle-neck and bail-wire of the stopper, grippers for looping said wire or string around the stopper-bail and bringing its ends in close proximity with each other, means for feeding a label into position below the ends of the string or wire, and means for clenching a sheet-metal staple over the ends of the string or wire onto the label so as to securely hold the safety-label and wire on the bottle-neck and stopper-bail, substantially as set forth.

3. A machine for attaching safety-labels to bottles with lever closing devices, which consists of a reciprocating quill, means for feeding a string or wire to said quill, grippers for holding said string or wire on the retraction of said quill, a rotary cutting-knife adjacent to one of the holding-grippers for cutting off said string or wire, feed-grippers for passing the cut-off string or wire between the neck of the bottle and stopper-bail, oscillating looping-grippers for bending it around the stopper-bail, means for feeding a label into position below the ends of the string or wire held by the looping-grippers, and means for clenching a sheet-metal staple over the ends of the string or wire onto the label so as to secure the string or wire and the label to the bottle-neck and stopper-bail, substantially as set forth.

4. In a machine for attaching safety-labels to bottles with lever closing devices, the combination of a reciprocating quill having a clutch on its end, means for feeding a string or wire to said quill, means for reciprocating the quill, holding-grippers located in line with the quill, one of said holding-grippers being provided with jaws having a center rib and side recesses and the other gripper with jaws having two recesses, and an intermittently-rotated cutting-knife for cutting off the required length of string or wire on the retraction of the quill, substantially as set forth.

5. In a machine for attaching safety-labels to bottles with lever closing devices, the combination of a reciprocating quill, means for feeding a string or wire to the quill, said quill being slotted at one end and provided with a clutch device at the other end, holding-grippers located in line with the quill, one of the holding-grippers being provided with jaws having two recesses and the other with jaws having a center rib and side recesses, means for opening or closing said holding-grippers at the proper time, and an intermittently-rotating cutting-knife entering into one of the recesses of one of the holding-grippers for cutting off the required length of wire, substantially as set forth.

6. In a machine for attaching safety-labels to bottles with lever closing devices, the combination of a reciprocating quill, means for feeding a string or wire to the quill, said quill being slotted at one end and provided with a clutch device at the other end, holding-grippers located in line with the quill, means for actuating said holding-grippers at the proper time, means for cutting off the required length of wire, and means for adjusting said cutting means.

7. In a machine for attaching safety-labels to bottles with lever closing devices, the combination, with a reciprocating quill, of means for feeding a string or wire to said quill, holding-grippers for engaging said string or wire, an intermittently-rotating cutting-knife for cutting off the proper length of wire, a crank-arm for supporting said knife, and means for adjusting said crank-arm so as to adjust the position of the cutting-knife relatively to the string or wire to be cut, substantially as set forth.

8. In a machine for attaching safety-labels to bottles with lever closing devices, the combination, with grippers for holding a string or wire, of feed-grippers that are moved forward alongside of the holding-grippers so as to take up the ends of the string or wire, means for moving the feed-grippers toward each other, means for moving them forward so as to pass the string or wire ends through the space between the bottle-neck and stopper-bail, and looping-grippers adapted to engage the ends of the string or wire after the same are moved forward by the feed-grippers, substantially as set forth.

9. In a machine for attaching safety-labels to bottles with lever closing devices, the combination, with grippers for holding a string or wire, said grippers having jaws provided with recesses, of feed-grippers adapted to engage the ends of said string or wire, means for moving the feed-grippers first parallel toward each other and then in forward direction so as to pass said ends through the space between the bottle-neck and the stopper-bail wire, looping-grippers for engaging the ends of said string or wire, and means for oscillating them in backward direction for looping the ends around the bail-wire and bringing them in proximity with each other, substantially as set forth.

10. In a machine for attaching safety-labels to bottles with lever closing devices, the combination, with grippers for holding a string or wire, of feed-grippers adapted to engage the ends of said string or wire, means for moving said feed-grippers first toward each other and then in forward direction so as to pass with the ends of the string or wire through the space between the bottle-neck and stopper bail-wire, looping-grippers for engaging the ends of the string or wire, said looping-grippers being provided with guides, and means for moving said looping-grippers in backward direction for bringing the ends of the string or wire in proximity to and parallel with each other, substantially as set forth.

11. In a machine for attaching safety-labels to bottles with lever closing devices, the combination, with the looping-grippers for holding the ends of a string or wire around a bottle-neck and stopper bail-wire, of means for intermittently feeding a paper band, cutting-dies for cutting a label from said band, a feed-table for said label, means for moving said table and label toward the looping-grippers, and means for clenching a sheet-metal staple over the ends of the string or wire onto the label, substantially as set forth.

12. In a machine for attaching safety-labels to bottles with lever closing devices, the combination of a reciprocating carrier, a paper strip guided in ways of said carrier, means for intermittently feeding the paper strip to said carrier, dies for cutting the labels from the paper strip, a forked table below the dies, means for raising said forked table to receive the cut-out label from the dies, a clenching mechanism, a stationary table in front of said clenching mechanism, and means for feeding the cut-out label forward at right angles to the paper-feeding device to the stationary tables and clenching mechanism.

13. In a machine for attaching safety-labels to bottles with lever closing devices, the combination with a paper-feeding device, of dies for cutting out the labels from the same, a weighted plunger in the upper cup-shaped die for pressing a suitable stamp on the label simultaneously with the cutting of the same, a forked table, a slide movable in the same to which the label is delivered, and means for reciprocating the slide in the forked table.

14. In a machine for attaching safety-labels to bottles with lever closing devices, the combination with a reciprocating carrier provided with guideways, of means for intermittently feeding a paper strip to said carrier, dies for cutting labels from said paper strip, a forked table below said dies, means for vertically reciprocating the forked table, a slide movable in said forked table, means for horizontally reciprocating said slide in the forked table so as to feed the cut-out label forwardly from the dies, a stationary platform to which the labels are delivered, and a staple-clenching device for attaching the labels to the ends of the safety strings or wires.

In testimony that I claim the foregoing as my invention I have signed my name in presence of two subscribing witnesses.

CARL ALBERT HIRTH.

Witnesses:
POURUD ZUIPIG,
WM. HAHN.